US012168218B1

(12) United States Patent
Saleem et al.

(10) Patent No.: US 12,168,218 B1
(45) Date of Patent: Dec. 17, 2024

(54) METHOD OF PREPARING ADSORBENT FROM DATE PIT AND A POLYMER

(71) Applicant: KING FAISAL UNIVERSITY, Al-Ahsa (SA)

(72) Inventors: Junaid Saleem, Doha (QA); Sk Safdar Hossain, Hofuf (SA); Zubair Khalid Baig Moghal, Doha (QA); Gordon McKay, Doha (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/378,826

(22) Filed: Oct. 11, 2023

(51) Int. Cl.

| | |
|---|---|
| ***B01J 20/24*** | (2006.01) |
| ***B01J 20/26*** | (2006.01) |
| ***B01J 20/28*** | (2006.01) |
| ***B01J 20/30*** | (2006.01) |
| ***C02F 1/28*** | (2023.01) |
| *C02F 101/30* | (2006.01) |

(52) U.S. Cl.
CPC ........... *B01J 20/3078* (2013.01); *B01J 20/24* (2013.01); *B01J 20/261* (2013.01); *B01J 20/28016* (2013.01); *B01J 20/28061* (2013.01); *B01J 20/305* (2013.01); *C02F 1/285* (2013.01); *C02F 1/286* (2013.01); *C02F 2101/308* (2013.01)

(58) Field of Classification Search
CPC .... B01J 20/24; B01J 20/261; B01J 20/28016; B01J 20/28004; B01J 20/28014; B01J 20/28061; B01J 20/28083; B01J 20/3038; B01J 20/305; B01J 20/3078; C02F 1/286; C02F 2101/308; C02F 1/285
USPC ........................................................ 502/402
See application file for complete search history.

(56) References Cited

U.S. PATENT DOCUMENTS

| | | | | |
|---|---|---|---|---|
| 8,992,670 | B1 | 3/2015 | Vohra | |
| 2006/0106136 | A1 | 5/2006 | Abu-Sharkh | |
| 2011/0303612 | A1* | 12/2011 | Al-Jiil | B01J 20/12 210/688 |
| 2011/0303900 | A1 | 12/2011 | Devisme et al. | |
| 2019/0202010 | A1 | 7/2019 | Thomas et al. | |

FOREIGN PATENT DOCUMENTS

| | | | | |
|---|---|---|---|---|
| CN | 1589160 | A * | 3/2005 | A61F 13/53 |
| CN | 116618013 | A * | 8/2023 | B01J 20/20 |
| WO | 2020079700 | A1 | 4/2020 | |

OTHER PUBLICATIONS

Abd-Aziz, N. H., et al. "A short review: Potential use of plastic waste as adsorbent for various pollutants." AIP conference proceedings. vol. 2124. No. 1. AIP Publishing, 2019.
Ahmad, Tanweer, et al. "The use of date palm as a potential adsorbent for wastewater treatment: a review." Environmental Science and Pollution Research 19 (2012): 1464-1484.
Faiad, Ali, et al. "Date palm tree waste recycling: treatment and processing for potential engineering applications." Sustainability 14.3 (2022): 1134.
Nistratov, Alexey Viktorovich, et al. "Production and evaluation of properties of waste-based carbon adsorbent." Chemical Engineering Research and Design 160 (2020): 551-560.
Saleem, Junaid, et al. "Production and applications of activated carbons as adsorbents from olive stones." Biomass Conversion and Biorefinery 9 (2019): 775-802.

* cited by examiner

*Primary Examiner* — Edward M Johnson
(74) *Attorney, Agent, or Firm* — Nath, Goldberg & Meyer; Joshua B. Goldberg

(57) ABSTRACT

A method of preparing an adsorbent can include pyrolyzing date pit to provide a date pit char, activating the date pit char, dissolving polyolefin waste in an organic solvent to obtain a solution, dispersing the date pit char in the solution to provide a mixture, extracting the solvent from the mixture to provide a composite, and annealing the composite to provide the adsorbent. The adsorbent can be porous.

14 Claims, 3 Drawing Sheets

METHOD OF PREPARING ADSORBENT FROM DATE PIT AND A POLYMER

BACKGROUND

1. Field

The present disclosure provides a method for preparing an adsorbent, and particularly, to a method for preparing an adsorbent from date pit and a waste polymer.

2. Description of the Related Art

Organic dyes that are disposed in natural waters may cause health side effects for human and/or aquatic life. Dyes, when discharged into receiving streams, will generally cause detrimental effects on the liver, gill, kidney, intestine, gonads, and pituitary gonadotrophic cells of aquatic life. In humans, they may cause irritation to the respiratory tract if inhaled, and irritation to the gastrointestinal tract if ingested. Contact of dyes with skin and eyes may cause irritation with redness and even permanent injury.

Other common organic wastewater pollutants include pharmaceuticals and personal care products, such as antibiotics (e.g., ciprofloxacin, levofloxacin, sulfamethoxazole) often found in surface waters and veterinary pharmaceuticals that enter the water via manure dispersion and animal excretion onto soils. Antibiotics in natural waters contribute to the spread of antibiotic resistance in microorganisms.

Since most organic dyes have high water solubility, they are generally difficult to remove by usual waste-treatment systems. Further, conventional adsorbents for dye and metal ion removal, such as activated carbon powder, require a filtration membrane and technique to separate the filtrate and the adsorbent.

Thus, an efficient, rapid, cost-effective, and environmentally friendly method for preparing an adsorbent for removal of pollutants from aqueous media is needed.

SUMMARY

The present subject matter relates to a method of preparing porous, activated carbon adsorbent flakes with a high surface area. The adsorbent flakes can be used for enhanced removal of pollutants from wastewater.

In one embodiment, the method of preparing an adsorbent can include pyrolyzing date pit to provide a date pit char, activating the date pit char, dissolving at least one polymer in an organic solvent to obtain a polymer solution, dispersing the activated date pit char in the polymer solution to provide a mixture, extracting the solvent from the mixture to provide a composite, and annealing the composite to provide the adsorbent. In an embodiment, the adsorbent can be cut into small pieces to provide adsorbent flakes. The adsorbent flakes can have sufficient strength and a large surface area. In an embodiment, the at least one polymer includes polypropylene, such as polypropylene waste from recycled polypropylene, one-time disposed of polypropylene, or recovered from a waste polypropylene material derived from post-consumer/industrial waste.

In another embodiment, the present subject matter is directed to a method of removing a pollutant from an aqueous solution comprising contacting the aqueous solution with the activated carbon adsorbent flakes. In an embodiment, the aqueous solution can include wastewater. In an embodiment, the pollutant can include an organic dye.

These and other features of the present subject matter will become readily apparent upon further review of the following specification.

BRIEF DESCRIPTION OF DRA WINGS

These and other features of the present subject matter will become readily apparent upon further review of the following specification.

Similar reference characters denote corresponding features consistently throughout the attached drawings.

DETAILED DESCRIPTION OF THE PREFERRED EMBODIMENTS

Figure 1:
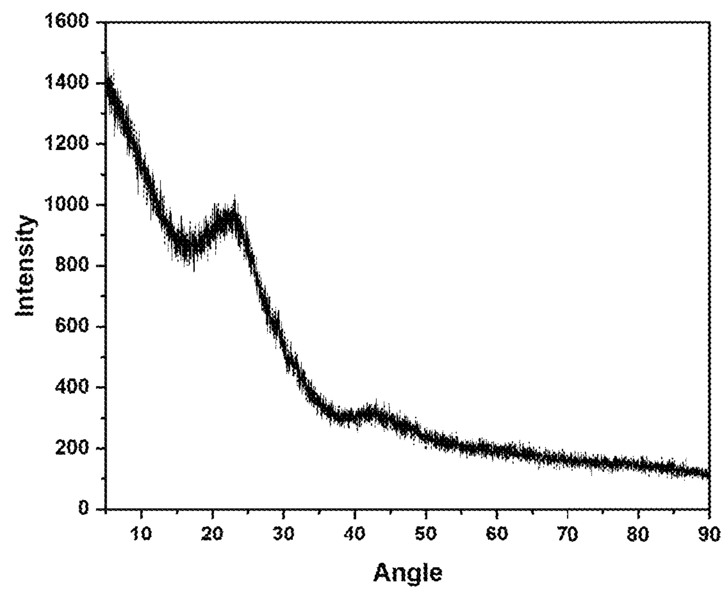
FIG. 1 is a graph of the XRD of the activated date pit char without polymer.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms “a”, “an”, and “the” include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms “include,” “includes”, “including,” “have,” “has,” or “having” should be generally understood as open-ended and non-limiting unless specifically stated otherwise.

The use of the singular herein includes the plural (and vice versa) unless specifically stated otherwise. In addition, where the use of the term “about” is before a quantitative value, the present teachings also include the specific quantitative value itself, unless specifically stated otherwise. As used herein, the term “about” refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of preparing activated carbon adsorbent flakes with a high surface area. The adsorbent flakes can be used for enhanced removal of pollutants from wastewater.

In one embodiment, the method of preparing activated carbon adsorbent flakes can include pyrolyzing date pit to provide activated carbon or date pit char, activating the date pit char, dissolving a polymer in an organic solvent to obtain a polymer solution, dispersing the activated date pit char in the polymer solution to provide a mixture, extracting the solvent from the mixture to provide a composite, and annealing the composite to provide the adsorbent. In an embodiment, the adsorbent can be cut into small flakes to provide porous activated carbon adsorbent flakes.

In an embodiment, the porous activated carbon adsorbent flakes can be contacted with an aqueous solution to remove a pollutant therefrom. In one embodiment, the aqueous solution can be a wastewater stream. In another embodiment, the pollutant is an organic dye, such as Congo red, methyl blue, methylene blue, malachite green, rhodamine B, bromophenol blue, rose Bengal dyes, Alizarin red, and Indigo carmine. In a particular embodiment, the organic dye includes at least one of Alizarin red and Indigo carmine.

In an embodiment, the at least one polymer comprises polypropylene, such as polypropylene waste from recycled polypropylene, one-time disposed of polypropylene, and/or recovered from a waste polypropylene material derived from post-consumer/industrial waste. In an embodiment, the at least one polymer can include polyethylene.

In an embodiment, the organic solvent that can be used to dissolve the polymer can be selected from the group consisting of p-xylene, o-xylene, m-xylene, an isomeric mixture of xylene, p-cymene, o-cymene, m-cymene, limonene, toluene, mesitylene, or other aromatic hydrocarbons.

In an embodiment, the method can include obtaining the date pits and washing the date pits with water to remove any impurities. The washed date pits can then be cut into small pieces and dried by any suitable means. In an embodiment, the cut date pit pieces can be dried by exposure to sunlight. In an alternative embodiment, the cut date pit pieces can be dried in a hot air oven at temperatures ranging from about 100° C. to about 120° C. for a period of time ranging from about 1 hour to about 2 hours. In an embodiment, drying about 1 kg of date pits can yield an amount of dried date pits ranging from about 800 grams to about 900 grams of dried date pit pieces.

The dried date pit pieces can be pyrolyzed by placing the dried date pit pieces in a furnace programmed to achieve a temperature of about 500° C. to about 700° C. at a rate of about 10° C./minute. In an embodiment, the dried date pit pieces can be pyrolyzed at a temperature of about 600° C. with a residence time of about 3 hours. The pyrolyzed date pits or date pit char can be cooled to room temperature at the same rate of about 10° C./min to obtain date pit char. In an embodiment, pyrolyzing an amount of about 800 grams to about 900 grams of dried date pit can yield about 100 grams to about 300 grams of date pit char.

In an embodiment, the dried date pit pieces can be wrapped in aluminum foil and placed inside a furnace for pyrolyzing. In an embodiment, the furnace can be programmed to reach a temperature of about 600° C. at about 10° C./min rate. The dried date pit pieces can be kept at about 600° C. for about 3 hours, followed by cooling to room temperature at the same rate of about 10° C./min. to obtain the activated date pit char. The furnace temperature can range from about 200° C. to about 1000° C. In an embodiment, the residence time can range from about 30 minutes to about 5 hours. In an embodiment, the rate of heating can range from about 2° C./min to about 20° C./min. In an embodiment, the rate of cooling can range from about 2° C./min to about 20° C./min.

In an embodiment, the furnace can be a tubular furnace, a muffle furnace, or a hot furnace. In an embodiment, the dried date pit pieces can be kept in a crucible without any covering.

In an embodiment, the pyrolyzed date pit or date pit char can be activated by immersing the pyrolyzed date pit in a solution including 2N $H_2SO_4$ and stirring for about 12 hours to about 24 hours. Then, the activated date pit char pieces can be removed from the solution by filtering, neutralizing with water, and drying.

In an embodiment, the polymer solution can be prepared by combining at least one polymer with an organic solvent. In an embodiment, the at least one polymer can include polypropylene. In an embodiment, the at least one polymer can further include polyethylene. In one embodiment, ultra-high molecular weight polyethylene and polypropylene can be mixed with p-cymene to form the polymer solution. Then, the polymer solution can be heated to a temperature ranging from about 120° C. to about 140° C. and stirred for about 20 minutes to about 40 minutes to dissolve the polymer and obtain a clear solution.

In an embodiment, the activated date pit char can be dispersed in the polymer solution to provide a mixture. Then, the solvent can be extracted from the mixture to provide a date-pit char composite. The date pit char composite can be annealed to obtain a dried, porous, adsorbent. In an embodiment, the date pit char composite can be heated to a temperature ranging from about 150° C. to about 180° C. for a period of time ranging from about 2 minutes to about one hour, e.g., at a temperature of about 170° C. for about 25 minutes. The date pit char composite can be heated in a hot air oven to provide the porous adsorbent.

After annealing, a porous, activated carbon adsorbent can be produced in a single block, e.g., a cylindrical-shaped block. The block can be cut into small flakes having sizes ranging from about 3 mm to about 20 mm. The flakes or porous activated carbon adsorbent flakes can have a high adsorption capacity and a large surface area. In an embodiment, the surface area of the adsorbent can range from about 150 $m^2/g$ to about 210 $m^2/g$. In an embodiment, an average pore size of the adsorbent can be about 1 nm to about 5 nm, e.g., 2 nm. In an embodiment, the adsorption capacity of the adsorbent flakes can range from about 230 mg/g to about 270 mg/g.

In another embodiment, the present subject matter is directed to a method of removing dyes from an aqueous solution, comprising contacting the aqueous solution with the activated carbon adsorbent flakes. In an embodiment, the aqueous solution can include wastewater.

In an embodiment, the adsorbent flakes can be contacted with the aqueous solution by dispersing the adsorbent flakes into the aqueous solution. Once contacted with the aqueous solution, the adsorbent flakes can adsorb dye and other pollutants in the aqueous solution. After use, the adsorbent flakes can be removed from the aqueous solution by any suitable means, e.g., by collecting with a net or other suitable tool. As the adsorbent flakes are large and less dense than water, they can float on the surface of water. As such, the adsorbent flakes can be collected easily after use, without requiring use of a filtration unit.

After collecting the used adsorbent flakes, the dyes can be desorbed from the adsorbent flakes so that the adsorbent flakes may be reused. In an embodiment, the dyes can be desorbed from the adsorbent flakes in alcohol solution. The dyes can be desorbed with high efficiency. In an embodiment, the adsorbent flakes can be reused after desorbing the dyes therefrom.

In an additional embodiment, the adsorbent flakes described herein can be used to remove cations, anions, and/or heavy metal ions from a liquid, for example, from wastewater.

The following examples illustrate the present teachings.

EXAMPLES

Example 1

Preparation of Adsorbent 1 kg of date pit seeds was collected and washed with water to remove any pulp impurities. The washed date pits were cut into small pieces by mechanical cutting, followed by drying. The drying was carried out under the sun, where it was kept for two days. The date pit pieces can also be dried in a hot air oven kept at 110° C. for 1-2 hours. The yield in this step ranges between 800-900 grams.

The dried date pits pieces were wrapped in an aluminum foil and placed inside the tubular furnace. Then, the tubular furnace was programmed to reach 600° C. at 10° C./min rate. The residence time was kept at 600° C. for 3 hours, followed by cooling to room temperature at the same rate of 10° C./min. In this manner, date pit char was obtained. The yield in this step ranged between 100-300 grams.

To activate the pyrolyzed date pits, the pyrolyzed date pits were dipped in 2N $H_2SO_4$ solution and stirred overnight. Then, the date pit pieces were filtered and neutralized with water and dried under shade. The yield in this step ranged between 100-300 grams.

1 g of polyethylene, 1 g of polypropylene, and 1 g of ultrahigh molecular weight polyethylene were taken in a round-bottomed flask and 100 ml of p-cymene was added to it. Then, the solution was heated to 140° C. and stirred for 30 minutes to dissolve the polymer.

After obtaining a clear solution, the activated date pit char (49 g) was dispersed in the polymer solution for 15 minutes. Then, the solution was poured into a cylindrical beaker having a height that was more than its diameter. Then, the solvent was extracted either by keeping it inside the hood or by applying a vacuum to obtain a dried porous composite with little or no strength. The yield in this step ranged between 45-51 grams.

The beaker with the date pit char composite was then subjected to annealing to at least 170° C. or up to the melting point of the polymer for 25 minutes inside the hot air oven or 2-5 minutes on the Heidolph hot plate. The activated date pit char-polymer composite adsorbent was removed from the beaker and cut into small flakes to obtain a porous activated carbon adsorbent with sufficient strength and a large surface area. The yield in this step ranged between 45-51 grams.

Example 2

XRD of Date Pit Char without and with Polymer

As shown in FIG. 1, the X-ray diffraction (XRD) image of the activated carbon or date pit char without polymer exhibited a notable peak of amorphicity, as a hump of about 26° was detected. This is consistent with the peak of graphite. The appearance of a broad diffraction background and the absence of a sharp peak reveals a predominantly amorphous structure. There are two broad diffraction backgrounds corresponding to $2\theta=25°$ and $2\theta=43°$ in the spectrum, which corresponds to the activated carbon. (FIG. 1).

Figure 2:
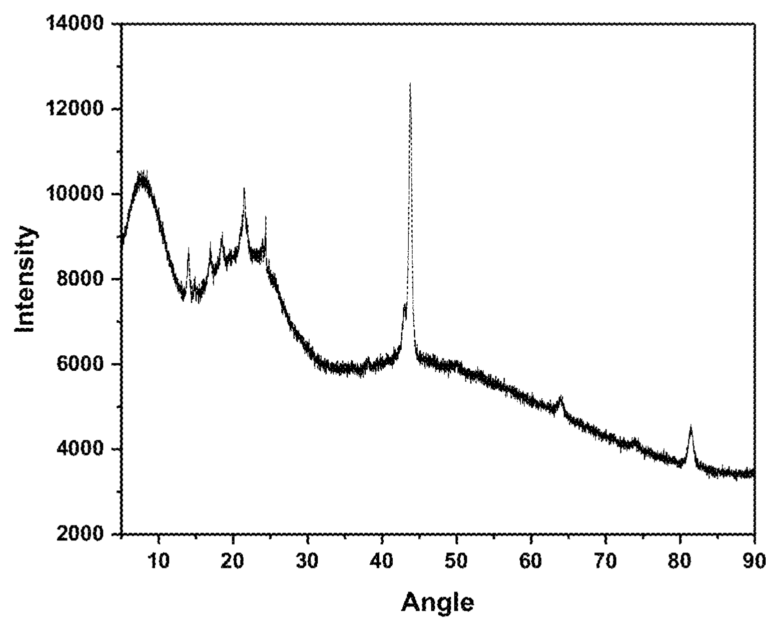
FIG. 2 is a graph of the XRD of the activated date pit char with polypropylene.

When the date pit char and the polymer were combined, the crystallite XRD patterns of PP and HDPE were observed at 13, 22 and 24, beside the carbon peaks. (FIG. 2).

Example 3

FTIR of Date Pit Char

Figure 3:
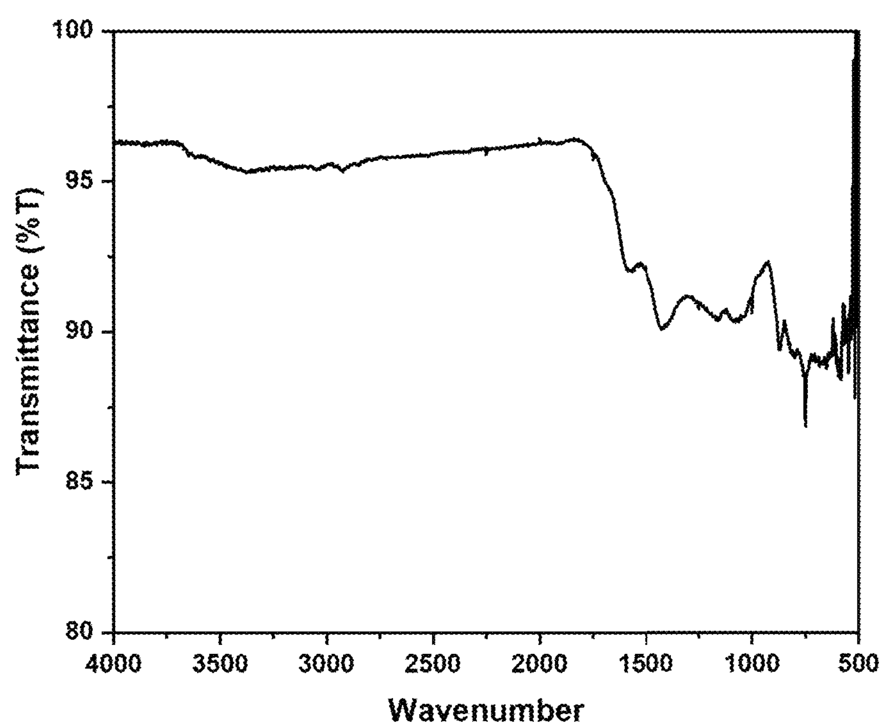
FIG. 3 is a graph showing the FTIR of the activated date pit char.

Fourier transform infrared (FTIR) spectra of the date pit char (FIG. 3) shows peaks at 1500-1600 $cm^{-1}$ belonging to C—O stretching, O—H bending, and C═O groups. A shift of the band was observed at 1000-1120 $cm^{-1}$, due to S═O vibrations of the sulfates and sulfoxides. A peak indicating S—O stretching vibration appeared in the lower regions, 673 $cm^{-1}$, due to the presence of sulfuric acid surface functional groups.

Example 4

Adsorption Isotherm of Alizarin Red by Date Pit Char

Figure 4:
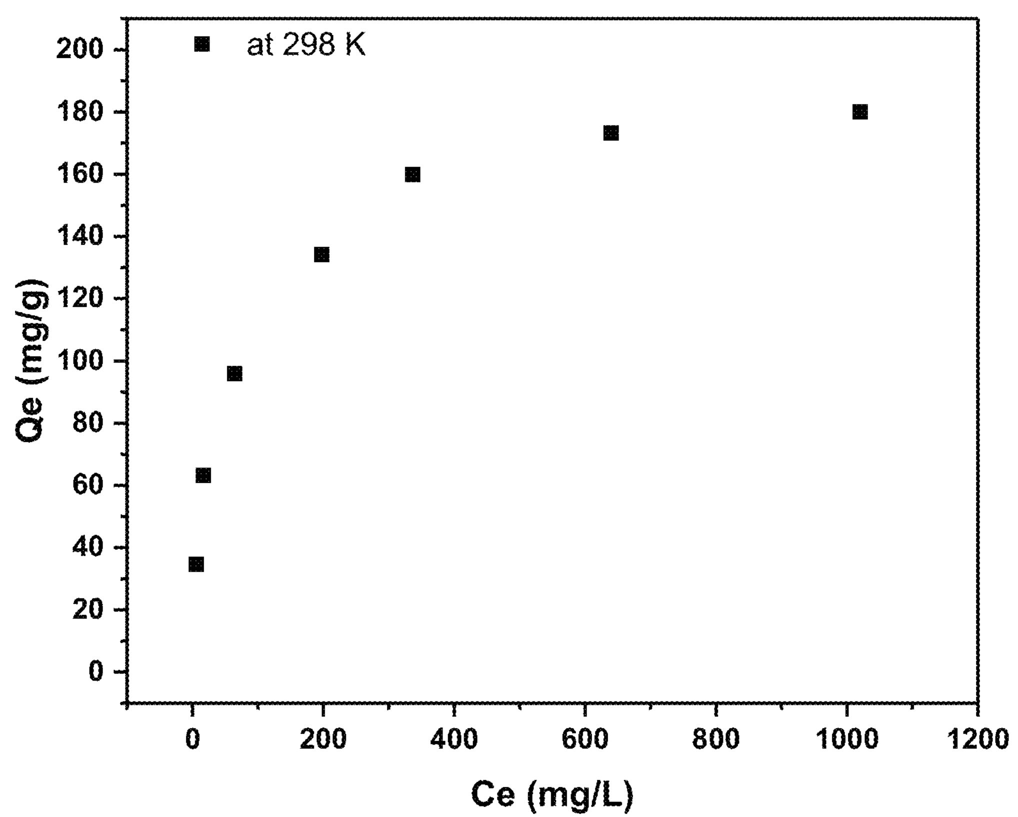
FIG. 4 is a graph showing the adsorption isotherm of alizarin red by the adsorbent prepared according to the present teachings.

As shown in FIG. 4, the adsorption capacity of the date pit char towards Alizarin red dye was in the range of 180 mg/g to 200 mg/g at temperatures ranging from about 25° C.

It is to be understood that the method for preparing an adsorbent from date pit char and a polymer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing an adsorbent from date pit char and a polymer, comprising:

obtaining date pits;

pyrolyzing the date pits to provide a date pit char;

activating the date pit char to provide an activated date pit char;

dissolving at least one polymer in an organic solvent to obtain a polymer solution;

dispersing the activated date pit char in the polymer solution to provide a mixture;

extracting the organic solvent from the mixture to provide a composite; and annealing the composite to provide the adsorbent;

wherein the organic solvent is p-cymene;

wherein dissolving the at least one polymer in the organic solvent comprises:

heating the organic solvent containing the polymer to a temperature ranging from about 120° C. to about 140° C.; and stirring the organic solvent containing the polymer for about 20 minutes to about 40 minutes.

2. The method of claim 1, wherein the at least one polymer comprises polypropylene.

3. The method of claim 2, wherein the at least one polymer further comprises polyethylene.

4. The method of claim 1, further comprising cutting the adsorbent to provide adsorbent flakes.

5. The method of claim 4, wherein the adsorbent flakes have sizes ranging from about 3 mm to about 30 mm.

6. The method of claim 4, wherein a surface area of the adsorbent flakes ranges from about 150 $m^2/g$ to about 210 $m^2/g$.

7. The method of claim 4, wherein an average pore size of the adsorbent flakes ranges from about 1 nm to about 5 nm.

8. The method of claim 1, wherein the date pits are pyrolyzed at a temperature ranging from about 200° C. to about 1000° C. at a residence time ranging from about 30 minutes to about 5 hours.

9. The method of claim 1, wherein the pyrolyzed date pits are activated by immersing the pyrolyzed date pits in a solution including 2N $H_2SO_4$.

10. The method of claim 1, wherein the annealing comprises heating of the composite at a temperature ranging from about 150° C. to about 180° C. for a period of time ranging from about 2 minutes to about one hour.

11. A method of removing a pollutant from an aqueous solution, comprising contacting the adsorbent as prepared in claim 1 with the aqueous solution.

12. The method of claim 11, wherein the aqueous solution comprises wastewater.

13. The method of claim 11, wherein the pollutant comprises organic dyes.

14. The method of claim 13, wherein the organic dyes are selected from the group consisting of Alizarin red, Indigo carmine, and a mixture thereof.

* * * * *